Feb. 26, 1957 M. E. SPECHT 2,782,586
AUXILIARY CUTTER ATTACHMENT FOR LAWN MOWERS
Filed Nov. 25, 1955 2 Sheets-Sheet 2
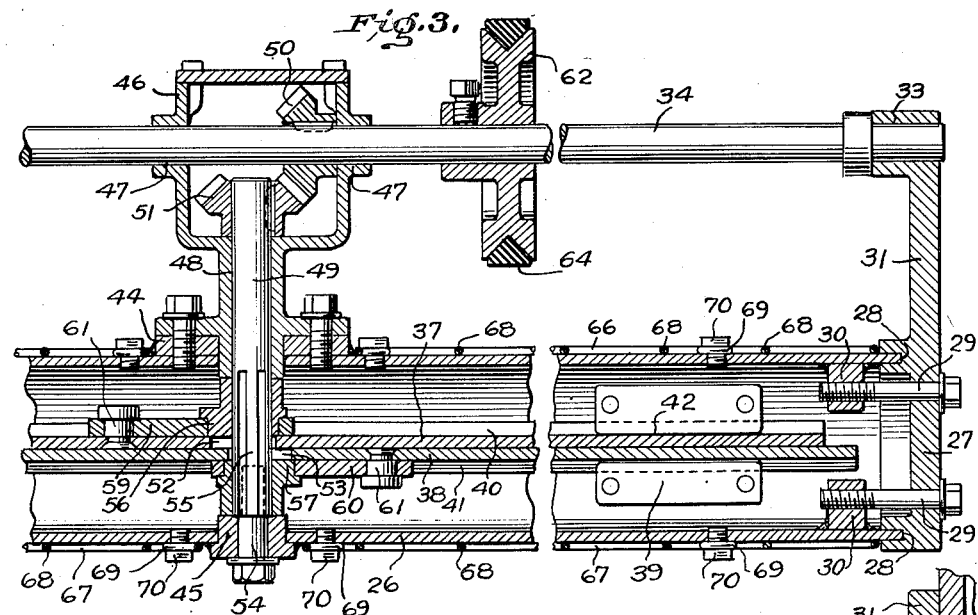
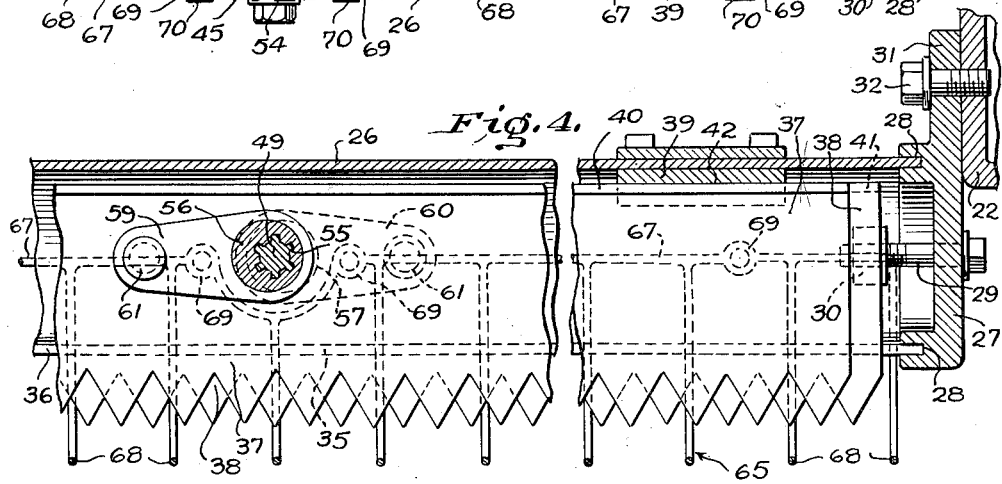
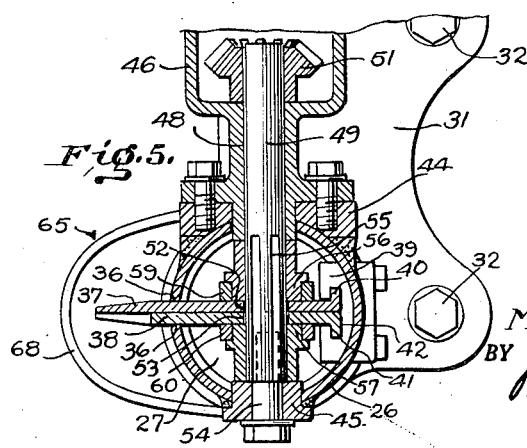
INVENTOR.
Merle E. Specht
BY
Reginald W. Hoagland
ATTORNEY

United States Patent Office 2,782,586
Patented Feb. 26, 1957

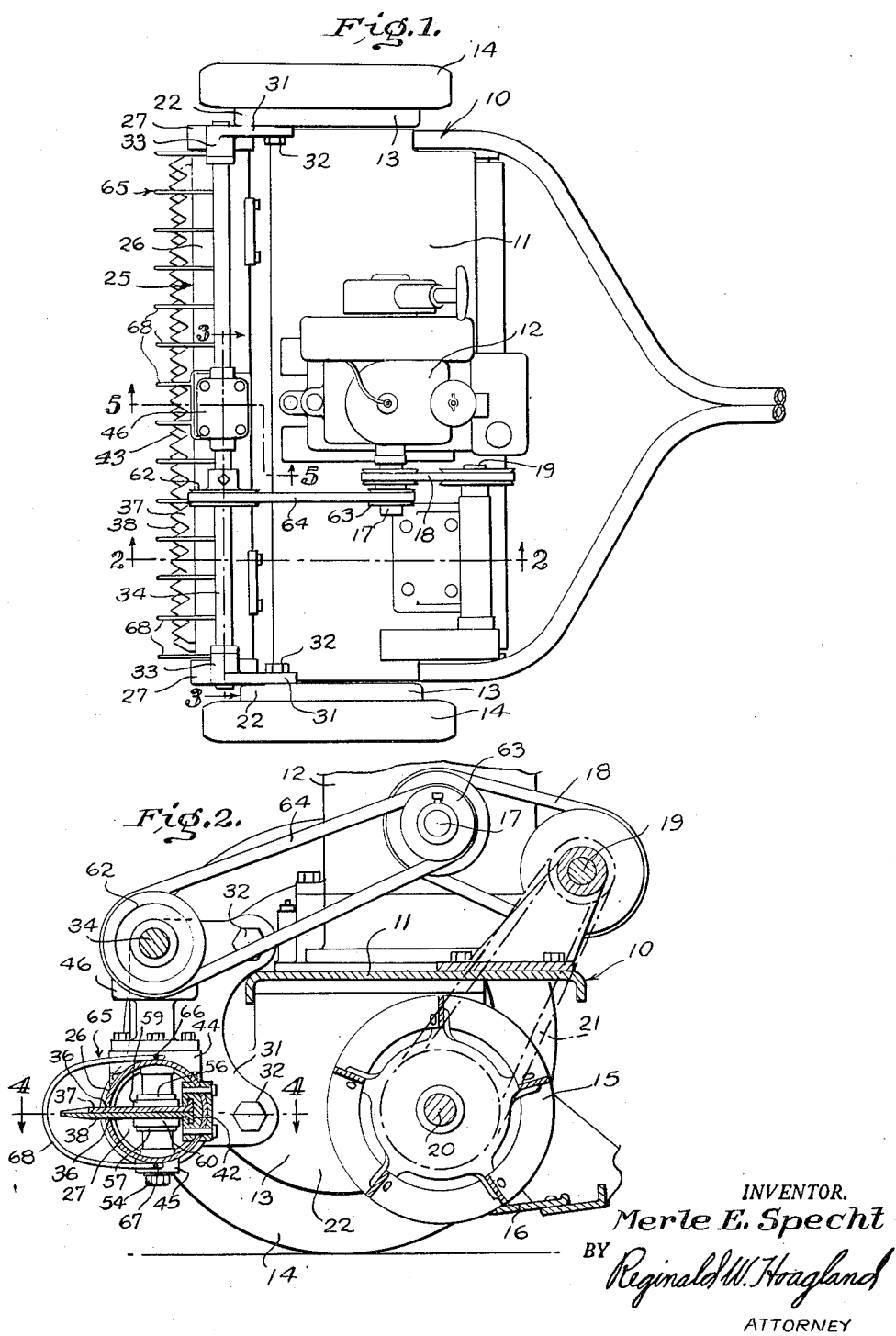

2,782,586

AUXILIARY CUTTER ATTACHMENT FOR LAWN MOWERS

Merle E. Specht, Marathon, Fla.

Application November 25, 1955, Serial No. 549,078

11 Claims. (Cl. 56—238)

The present invention relates to attachments to lawn mowers for cutting tall vegetation in advance of the normal cutting elements of ordinary lawn mowers.

The general practice at the present time is to cut grass with powered lawn mowers, either of a rotary or a reel type, and with a preference for the rotary because of its greater ability to cut long-stemmed weeds in lawns which invariably grow to greater heights than grass between lawn cuttings. However, it is an established fact that where there are well-kept lawns and especially those cared for by professional gardeners and where weeds are not so prevalent, reel type mowers are used almost exclusively because their shearing action produces smooth, uniform cuts.

It is therefore an object of this invention to provide an additional cutter in the form of an attachment to the usual reel type lawn mower which will cut tall vegetation in advance of that being cut by the revolving reel of the lawn mower to a height whereby said vegetation will be further and efficiently cut by the reel.

Another object of the invention is to provide a lawn mower attachment of the character indicated wherein a pair of toothed cutter bars are simultaneously reciprocated in opposite longitudinal directions for producing shearing cuts to vegetation positioned between teeth of the different cutter bars.

A further object of the invention is to provide in a device of the character set forth, a novel and improved construction for transmitting reciprocatory motion to the cutter bars from rotary motion imparted by the power source of the lawn mower to which the forward cutter bars are attached.

A still further object of the invention is to provide in a device as outlined above, a drive shaft extending substantially the full width of the lawn mower and having thereon a pulley which is adjustable to different locations transversely of the lawn mower and in accordance with the location of a power-supplying pulley on the lawn mower for proper belt alignment of said pulleys.

Another object of the invention is to provide in a device of the character set forth, a novel and improved construction and arrangement of parts for mounting a housing of the device on a lawn mower and for mounting and assembling movable cutter bars in the housing.

It is also an object of the invention to provide a device of the above-indicated character which is simple and substantial in construction, economical to manufacture, and thoroughly efficient and practical in use.

These, together with various auxiliary features and objects of the invention which will later become apparent as the following description proceeds, are attained by the present invention, a preferred embodiment of which has been illustrated by way of example only in the accompanying drawings wherein:

Figure 1 is a plan view of a reel type power lawn mower showing the improved auxiliary cutter attached;

Figure 2 is an enlarged vertical section taken on line 2—2 of Figure 1;

Figure 3 is a further enlarged fragmentary vertical sectional view taken substantially on line 3—3 of Figure 1, showing parts broken away;

Figure 4 is a fragmentary horizontal section taken on line 4—4 of Figure 2 of the parts as shown in Figure 3; and, Figure 5 is a vertical cross section of the improved device taken on line 5—5 of Figure 1 and with the upper portion of the device broken away.

Referring now more specifically to the accompanying drawings wherein like numerals designate similar parts throughout the various views, the numeral 10 indicates generally a reel type power lawn mower having a frame 11 constructed with an elevated platform on which a gasoline engine 12 is mounted, and a pair of side members 13 on which the traction wheels 14, reel 15, and bed plate 16 are mounted. The engine shown is of the single cylinder vertical type having a horizontal rotatable power-supplying shaft 17 extending from one side thereof which is shown connected by a pulley and belt drive 18 to an auxiliary shaft 19 which in turn is connected to the shaft 20 of the rotatable reel 15 by either belt or chain drive 21, as shown in dash and dot lines in Figure 2. It is to be assumed that the traction wheels 14 are driven by the usual pinion and ring gear constructions connecting the reel shaft 20 to the traction wheels 14 and confined within the drum-like cylindrical housings 22 of the side members 13 of the frame.

The improved cutter attachment forming the subject of this invention is designated generally by the numeral 25, and as shown in Figures 1 and 2, extends transversely across the forward portion of the lawn mower in advance of the revolving cutter reel 15 and is supported relative to the ground surface for cutting vegetation at a higher elevation than that accomplished by the blades of the revolving reel 15 passing over the bed knife 16. A cylindrical housing 26 constructed from a tubular member and having brackets 27 secured to the opposite ends thereof provides a rigid structure spanning the space between the pair of side members 13 of the frame 11 of the lawn mower for supporting the cutting bars and operating elements therefor.

Each end bracket 27 is provided with an annular groove 28 in its inner side into which is received an end portion of the tubular housing member 26, and there are provided a pair of bolts 29 that extend through openings in the end wall of the bracket and thread into lugs 30, welded or otherwise secured to the inside of the tubular housing for securely holding the bottom surfaces of said grooves against an end of the tubular housing member. Projecting rearwardly and upwardly from each end bracket 27 is a web-like flange 31 with a pair of spaced holes in its rear portion through which bolts 32 extend and attach said bracket to the forward portion of the inner face of a drumlike cylindrical housing 22 of the lawn mower frame 11. Formed on each flange 31 of each bracket 27 directly above the attachment to an end of the tubular housing member 26 is a bearing 33 into which is rotatably supported an end of a transverse drive shaft 34, the purpose of which will be set forth as the description proceeds.

The tubular housing member 26 is slit, as at 35, throughout its length and along its forward side to provide spaced ledges 36 for aiding in slidably supporting a pair of juxtaposed cutter bars 37 and 38 positioned partially within and partially forward of said housing by extending through said slit. The ledges 36, which are shown as being constructed by merely slitting the housing, may be reinforced or may have their bearing surfaces that contact the cutter bars increased in size to render the same more efficient. Also slidably supporting the cutter bars 37 and 38 and guiding them in their movement longitudinally of the housing 26 is a pair of spaced guide blocks 39, one being fixed to the inside of said housing adjacent each end thereof. Along the rear edge portions of the cutter bars 37 and 38 is an upstanding flange 40 and a depending flange 41, respectively, which together with adjacent rear portions of said cutter bars, slide through T-shaped grooves 42 in the guide blocks 39. The flanges 40 and 41 which extend the full length of the cutter bars 37 and 38 not only guide the cutter bars in their movement, but also provide stiffening elements for eliminating flexing of said bars. Along the forward longitudinal edge portions of both cutter bars 37 and 38, there are formed teeth 43 whose cutting edges shear vegetation between them as the cutter bars are reciprocated longitudinally in opposite directions.

Substantially midway of the length of the cutter bars 37 and 38 and welded or otherwise fixed to the upper and lower sides of the tubular housing 26 are bosses 44 and 45, respectively, with aligned openings therethrough leading to the interior of the housing. Bolted to the upper boss 44 is the lower end portion of a gear housing 46 which has bearings 47 in opposite end walls thereof through which the transverse drive shaft 34 extends and a vertical bearing 48 into which is rotatably supported a vertical stub shaft 49. Within the gear housing 46 and keyed to the shafts 34 and 49 is a pair of meshed bevel gears 50 and 51, respectively, for imparting rotary movement from the shaft 34 to the shaft 49.

The lower end portion of the vertical stub shaft 49 projects into the tubular housing 26, through elongated openings 52 and 53 in the cutter bars 37 and 38, and has threaded into its lower extremity a shouldered bolt 54 which extends through the aligned opening in the lower boss 45 and supports said shaft against endwise movement. Splined, as at 55, to the portion of the stub shaft within the tubular housing is a pair of oppositely directed eccentrics 56 and 57, one being positioned above the upper cutter bar 37 and the other below the lower cutter bar 38. Both eccentrics 56 and 57 are shouldered, as at 58, and have the smaller diameters thereof received in openings in the ends of links 59 and 60, respectively, which in turn have their opposite ends pivotally connected, as at 61, to different cutter bars 37 and 38. The shouldering of the eccentrics is for the purpose of retaining the links in place thereon.

Adjustable on and secured to the transverse drive shaft 34 is a pulley 62 which is driven from another pulley 63 on the power output shaft 17 of the engine 12 by a belt 64. Because of different constructions of different makes of power lawn mowers to which the auxiliary cutter is to be attached, a long transverse shaft 34 with adjustable pulley 62 thereon is provided. This permits adjustment of the pulley 62 for proper belt alignment with the pulley 63 on the power output shaft of the engine according to the location available for attachment of the pulley 63.

A guard frame 65 consisting of upper and lower strands of wire 66 and 67 that extend longitudinally of the tubular housing and a plurality of spaced forwardly bowed strands of wire 68 that have their opposite ends attached to the strands 66 and 67 provide a wire frame of a single unit construction. The intermediate portions of the bowed strands of wire 68 are in advance of the teeth of the cutter bars and thereby form protection against objects of greater width than that of the spaces between said strands from becoming engaged with said teeth. At spaced intervals along the longitudinal strands 66 and 67, loops 69 are provided through which are extended bolts 70 that thread into tapped openings in the tubular housing for attachment of the guard frame to said housing.

It is to be noted that at the different bearings throughout the improved device, and especially at the connection of the eccentrics 56 and 57 to the links 59 and 60, sealed ball bearings may be employed, and that grooves may be provided in the adjacent sliding faces of the cutter bars or at other locations where parts slide relative to one another for the reception of oil wicks in order to properly lubricate movable parts.

It will further be observed that the eccentric driving connections shown and described reciprocate the cutter bars in opposite directions thereby reducing the length of the strokes of the cutter bars in effecting efficient cuts. Also this type of eccentric driving connection produces a smooth action free from hammer blows which set up vibrations and cause a destruction of parts.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. An attachment for power lawn mowers having a main frame with side members and a power output shaft, said attachment comprising an elongated housing extending transversely of said lawn mower, brackets secured to the ends of said housing, flanges on opposite ends of said housing, bolts securing said flanges to the side members of said frames, said housing having a longitudinal slot through the forward side thereof, a pair of juxtaposed cutter bars slidable longitudinally in said slot and within and forwardly of said housing, teeth along the longitudinal forward edges of said cutter bars and forwardly of said slot, guide means in said housing and slidably engaged by said cutter bars for controlling sliding movement of said bars, a stub shaft at right angles to said cutter bars and rotatably mounted on said housing, a pair of oppositely directed eccentrics on the lower end of said stub shaft and rotatable therewith, means connecting said eccentrics to different cutter bars for reciprocating said cutter bars simultaneously in opposite directions upon rotation of said stub shaft, and a drive connection between said stub shaft and the power output shaft of said lawn mower for rotating said stub shaft.

2. An attachment for power lawn mowers having a main frame with side members and a power output shaft, said attachment comprising an elongated housing extending transversely of said lawn mower, flanges on the ends of said housing and at the forward portions of the inner faces of the side members of said frame, bolts securing said flanges to said side members, said elongated housing having a longitudinal slot through the forward side thereof, a pair of juxtaposed cutter bars slidable longitudinally in said slot and within and forwardly of said housing, teeth along the longitudinal forward edges of said cutter bars and forwardly of said slot, oppositely directed stiffening flanges along the longitudinal rearward edge portions of said cutter bars, spaced guide blocks fixed in said housing and having grooves therein through which the flanged edge portions of said cutter bars slide, a vertically upstanding stub shaft rotatably mounted on said housing, connecting means between said stub shaft and said cutter bars for reciprocating said cutter bars simultaneously in opposite directions upon rotation of said stub shaft, and a drive connection between said stub shaft and the power output shaft of said lawn mower for rotating said stub shaft.

3. An attachment for power lawn mowers having a main frame with side members and a power output shaft, said attachment comprising a tubular housing extending transversely of said lawn mower, brackets secured to the ends of said housing, flanges on said bracket that overlie the forward portions of the inner faces of the side members of said frame, bolts securing said flanges to said side members, said tubular housing having a longitudinal slot through the forward side thereof, a pair of juxtaposed cutter bars slidable longitudinally in said slot and partially received within said housing, teeth along the longitudinal forward edges of said cutter bars and forwardly of said slot, guide means in said housing and slidably engaged by said cutter bars for controlling sliding movement of said bars, a vertically upstanding stub shaft rotatably mounted on and intermediate the ends of said housing, a pair of oppositely directed eccentrics fixed to the lower end of said stub shaft and within said housing, means connecting said eccentrics to different cutter bars for reciprocating said cutter bars simultaneously in opposite directions upon rotation of said stub shaft, and a drive connection between said stub shaft and the power output shaft of said lawn mower for rotating said stub shaft.

4. An auxiliary cutter in combination with a power lawn mower having a power output shaft, and a main frame with side members, said auxiliary cutter comprising an elongated housing extending transversely of said lawn mower, rearwardly directed flanges on the ends of said housing and overlying faces of the side members of said frame, fastener elements securing said flanges to said side members, said housing having a longitudinal slot through the forward side thereof, a pair of juxtaposed cutter bars slidable longitudinally in said slot and within and forwardly of said housing, teeth on the longitudinal forward edges of said cutter bars and forwardly of said slot, guide means in said housing and slidably engaged by said cutter bars for controlling sliding movement of said bars, a stub shaft at right angles to said cutter bars and rotatably mounted on said housing, connecting means between said stub shaft and said cutter bars for reciprocating said cutter bars simultaneously in opposite directions upon rotation of said stub shaft, and a drive connection between said stub shaft and the power output shaft of said lawn mower for rotating said stub shaft.

5. An auxiliary cutter in combination with a power lawn mower having a power output shaft, and a main frame with side members, said auxiliary cutter comprising a tubular housing extending transversely of said lawn mower, brackets secured to the ends of said housing, flanges on said brackets and overlying faces of the side members of said frame, fastener elements securing said flanges to said side members, said tubular housing having a longitudinal slot through the forward side thereof, a pair of juxtaposed cutter bars slidable longitudinally in said slot and partially received within said housing, teeth on the longitudinal forward edges of said cutter bars and forwardly of said slot, guide means in said housing and slidably engaged by said cutter bars for controlling sliding movement of said bars, a vertical upstanding stub shaft rotatably mounted on and intermediate the ends of said housing, connecting means between said stub shaft and said cutter bars for reciprocating said cutter bars simultaneously in opposite directions upon rotation of said stub shaft, and a drive connection between said stub shaft and the power output shaft of said lawn mower for rotating said stub shaft.

6. An auxiliary cutter in combination with a power lawn mower having a power output shaft, and a main frame with side members, said auxiliary cutter comprising a tubular housing extending transversely of said lawn mower, brackets secured to the ends of said housing, flanges on said brackets and overlying faces of the side members of said frame, fastener elements securing said flanges to said side members, said tubular housing having a longitudinal slot through the forward side thereof, a pair of juxtaposed cutter bars slidable longitudinally in said slot and partially received within said housing, teeth on the longitudinal forward edges of said cutter bars and forwardly of said slot, guide means in said housing and slidably engaged by said cutter bars for controlling sliding movement of said bars, a vertical upstanding stub shaft rotatably mounted on and intermediate the ends of said housing, a pair of oppositely directed eccentrics fixed to the lower end of said shaft and within said housing, a pair of links engaged by said eccentrics and each connected to a different cutter bar for reciprocating said cutter bars simultaneously in opposite directions upon rotation of said stub shaft, and a drive connection between said stub shaft and the power output shaft of said lawn mower for rotating said stub shaft.

7. An auxiliary cutter in combination with a power lawn mower having a transversely arranged power output shaft, and a main frame with side members that rotatably support traction wheels, rotatably support a reel with cutter blades, and support a bed knife engaged by said blades, said auxiliary cutter comprising a tubular housing extending transversely of said lawn mower and spanning the space between the side members of said frame, fastener elements securing the end portions of said housing to said side members, said tubular housing having a longitudinal recess through the forward side thereof, a pair of juxtaposed cutter bars slidable longitudinally in said recess and within and forwardly of said housing, teeth on the longitudinal forward edges of said cutter bars, guide means in said housing and slidably engaged by said cutter bars for controlling sliding movement of said bars, a vertical upstanding stub shaft rotatably mounted on said housing, connecting means between said stub shaft and said cutter bars for reciprocating said cutter bars simultaneously in opposite directions upon rotation of said stub shaft, a horizontal shaft arranged above and parallel to said tubular housing and having its ends rotatably supported by said brackets, means connecting said vertical stub shaft to said horizontal shaft for rotating said stub shaft upon rotation of said horizontal shaft, a pulley adjustable along said horizontal shaft for rotation therewith, a second pulley on said power output shaft, and a belt around both of said pulleys.

8. An auxiliary cutter in combination with a power lawn mower having a transversely arranged power output shaft, and a main frame with side members that rotatably support traction wheels, rotatably support a reel with cutter blades, and support a bed knife engaged by said blades, said auxiliary cutter comprising a tubular housing extending transversely of said lawn mower, brackets secured to the ends of said housing, rearwardly directed flanges on said brackets and at the forward portions of the inner faces of the side members of said frame, fastener elements securing said flanges to said side members, said tubular housing having a longitudinally extending slot through the forward side thereof, a pair of juxtaposed cutter bars slidable longitudinally in said slot and within and forwardly of said housing, teeth on the longitudinal forward edges of said cutter bars and forwardly of said slot, guide means in said housing and slidably engaged by said cutter bars for controlling sliding movement of said bars, a vertical upstanding stub shaft rotatably mounted on said housing, connecting means between said stub shaft and said cutter bars for reciprocating said cutter bars simultaneously in opposite directions upon rotation of said stub shaft, a horizontal shaft arranged above and parallel to said tubular housing and having its ends rotatably supported by said brackets, a drive connection between said vertical stub shaft to said horizontal shaft, a pulley adjustable along said horizontal shaft for rotation therewith, a second pulley on said power output shaft, and a belt around both of said pulleys.

9. An auxiliary cutter in combination with a power lawn mower having a transversely arranged power output shaft, and a main frame with side members that rotatably support traction wheels, rotatably support a reel with cutter blades, and support a bed knife engaged by said blades, said auxiliary cutter comprising a tubular housing extending transversely of said lawn mower, brackets secured to the ends of said housing, rearwardly directed flanges on said brackets and at the forward portions of the inner faces of the side members of said frame, fastener elements securing said flanges to said side members, said tubular housing having a longitudinal slot through the forward side thereof, a pair of juxtaposed cutter bars slidable longitudinally in said slot and within and forwardly of said housing, teeth on the longitudinal forward edges of said cutter bars and forwardly of said slot, guide means in said housing and slidably engaged by said cutter bars for controlling sliding movement of said bars, a vertical upstanding stub shaft rotatably mounted on and intermediate the ends of said housing, a pair of oppositely directed eccentrics fixed to the lower end of said shaft and within said housing, a pair of links embracing said eccentrics and each connected to a different cutter bar for reciprocating said cutter bars simultaneously in opposite directions upon rotation of said stub shaft, a horizontal shaft arranged above and parallel to said tubular housing and having its ends rotatably supported by said brackets, beveled gears connecting said vertical stub shaft to said horizontal shaft, a pulley adjustable along said horizontal shaft for rotation therewith, a second pulley on said power output shaft, and a belt around both of said pulleys.

10. An auxiliary cutter as defined in claim 4 wherein a guard frame of single unit construction is provided and wherein said guard frame comprises connecting means for attachment to the elongated housing, and spaced bars with portions thereof in advance of the teeth on the cutter bars.

11. An auxiliary cutter as defined in claim 4 wherein a guard frame of single unit construction is provided and wherein said guard frame comprises a pair of spaced longitudinal bars, connecting means for attaching said longitudinal bars above and below the elongated housing, and other spaced bars having their opposite ends fixed to said longitudinal bars and with intermediate portions thereof in advance of the teeth on the cutter bars.

References Cited in the file of this patent
UNITED STATES PATENTS

| | | |
|---|---|---|
| 1,221,930 | Weibel | Apr. 30, 1917 |
| 1,647,867 | Hutsell | Nov. 1, 1927 |
| 1,943,675 | Jacobsen | Jan. 16, 1934 |